Figure 1:
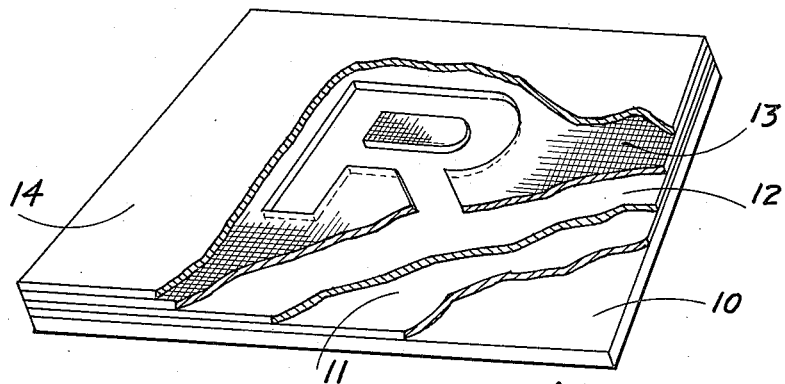

INVENTOR.
THOMAS S. REESE

May 1, 1945.　　　T. S. REESE　　　2,375,177
DECORATION OF SURFACES WITH LUMINESCENT MATERIALS
Filed Feb. 18, 1942　　　2 Sheets-Sheet 2

INVENTOR.
THOMAS S. REESE
BY Bosworth & Sessions
ATTORNEYS.

Patented May 1, 1945

2,375,177

UNITED STATES PATENT OFFICE 2,375,177

DECORATION OF SURFACES WITH LUMINESCENT MATERIALS

Thomas S. Reese, University Heights, Ohio, assignor to The Di-Noc Manufacturing Company, Cleveland, Ohio, a corporation of Ohio Application February 18, 1942, Serial No. 431,414

5 Claims. (Cl. 41—33)

This invention relates to the application of luminescent materials to surfaces and particularly to the printing of luminescent materials either directly on to the surface to be decorated or on to a transfer by means of which the decoration or design may be later applied to the surface to be decorated. By the terms decoration and design as used in this specification, I not only mean to include ornamental designs but also printed matter, diagrams and other indicia, as well as continuous coatings of luminescent material.

Luminescent materials may be divided into two groups, the fluorescent materials and phosphorescent materials. The fluorescent materials give off visible light only when subjected to radiation in or near the ultra-violet range of the spectrum. Phosphorescent materials also glow under ultra-violet light, but continue to glow for some time after exposure to the ultra-violet light has ceased. Both types of materials require white or light-colored, reflective backgrounds or undercoats beneath the luminescent materials for best results, and both types of materials require relatively heavy layers in order to produce the desired luminescence. Phosphorescent materials in particular are difficult to handle by ordinary printing methods because the pigments cannot be finely ground without destroying or impairing their phosphorescent characteristics. Thus it has heretofore been the practice to apply luminous materials in the manner that paints are ordinarily applied, that is, by spraying, brushing or by the use of screen stencils. Attempts made to print with luminous materials by relief or planographic processes have not met with any particular success because with both of these processes, it is very difficult, if not impossible, to apply sufficiently thick layers of the luminescent materials to produce the desired results, and further, the choice of vehicles for carrying the pigment is very limited.

According to the present invention, I eliminate the difficulties noted above and other difficulties that are encountered with known materials and methods, and provide materials and methods whereby surfaces may be rapidly and economically decorated with luminescent materials and combinations of luminescent materials and ordinary pigments, and in which the designs may be applied with great accuracy and fineness of detail. My invention contemplates the decoration of flexible materials such as paper, in which case, the printing may be carried out directly on the paper, and also the decoration of hard and rigid surfaces such as metal, wood, plaster board and the like, in which case, the printing operation is carried out upon a paper backing sheet to produce a transfer which is later applied to the surface to be decorated.

The invention involves various inter-related phases including, (1) the production of luminescent inks containing large proportions of pigment and of such characteristics that they can be handled by printing methods as distinguished from painting, spraying or stenciling; (2) the devising of a method of printing whereby adequate quantities of the inks can be laid down accurately and economically by existing printing machinery and (3) the production of transfers whereby the designs produced by the luminous inks can be readily applied to surfaces of hard and rigid materials.

Figure 2:
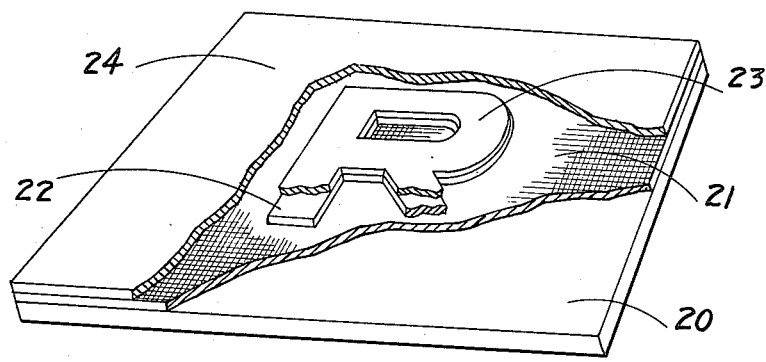
Figure 3:
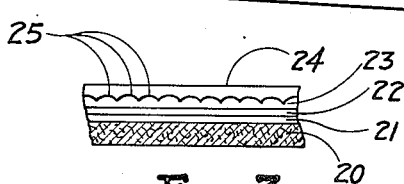
Figure 4:
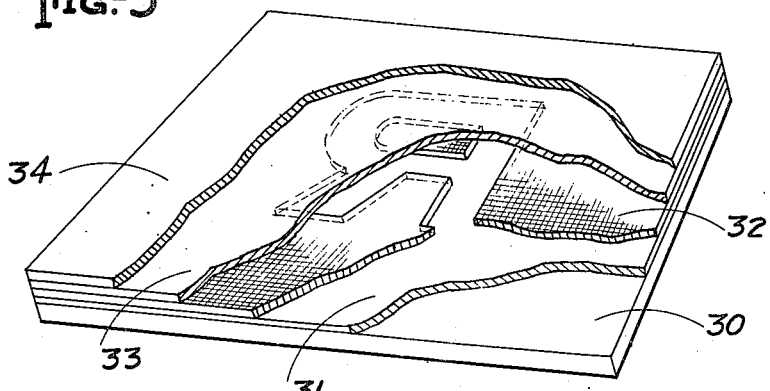
Figure 5:
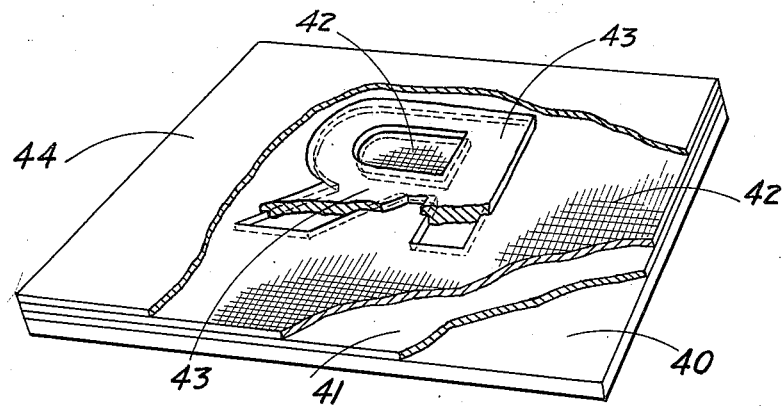
Figure 6:
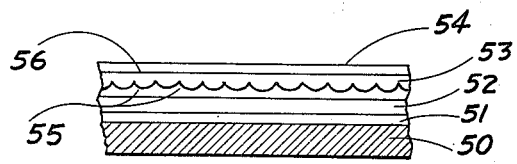
Figure 7:
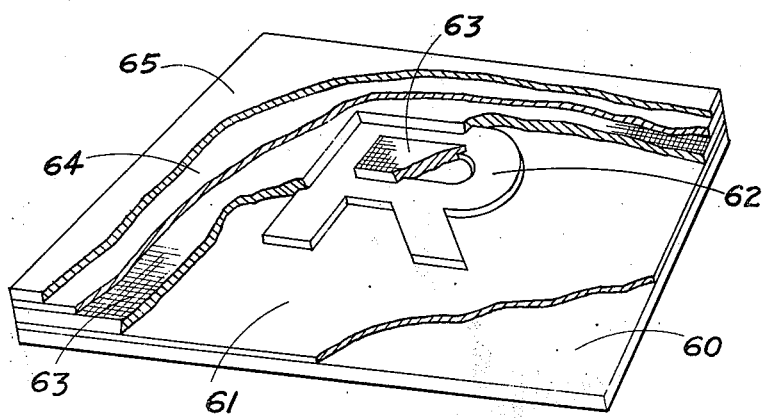

In the drawings, in which I have diagrammatically illustrated preferred forms of my invention, Figures 1 and 2 show luminous designs printed on paper or similar material in accordance with my invention; Figure 3 is a section on a greatly enlarged scale through a luminescent design printed on paper; Figures 4 and 5 illustrate transfers made according to my invention; Figure 6 is a section on a greatly enlarged scale showing a luminescent transfer applied to an opaque surface; and Figure 7 illustrates a transfer designed for application to glass or other transparent material.

With reference to the provision of suitable inks for carrying out my invention, I find that by employing inks embodying vehicles comprising suitable gums or resins and evaporable solvents, and incorporating in the vehicles relatively high percentages of pigments, together with suitable plasticizers, that very satisfactory results can be obtained. Care must be exercised not to use materials which will react with the luminous pigments, and it is also important to use as vehicles materials which are not opaque to ultra-violet light. I preferably employ lacquers of the cellulose ester type, or spirit varnishes such as Dammar gum with toluol as the solvent. Other gums or resins that may be employed as vehicles include the following: alkyds, vinyls, arochlors, urea formaldehyde, acryloids, cellulose ethers.

The vehicles are prepared with volatile solvents so that the inks will initially dry quickly by evaporation, rather than by oxidation or polymerization. Then the printed articles can be handled promptly after the printing operation, even though with some of the gums or resins, such as the alkyds, the articles may be subjected to a baking operation to complete the drying or setting of the ink by polymerization or oxidation. In general, the proportions of pigment to vehicle employed in my inks are much greater than the proportions employed in luminescent paints, enamels or lacquers embodying the same vehicles. Based on the same amount of vehicle, my inks may contain from 25 to 75 percent more pigment than paints, enamels or lacquers embodying the same or similar materials.

The following is a typical formula for the vehicle of an ink of the lacquer base type:

Lacquer base vehicle (percentages by weight)

| | Per cent |
|---|---|
| R. S. ½° nitrocellulose | 13.3 |
| Alcohol | 4.4 |
| Resin | 26.6 |
| Dibutyl phthalate | 7.2 |
| Thinner: | |
| 60%—toluol | |
| 17%—ethyl acetate | 48.5 |
| 15%—butyl acetate | |
| 8%—butanol | |
| Total | 100 |

To produce a preferred form of luminescent ink embodying such a vehicle, 100 parts by weight of the vehicle are mixed with about 300 parts by weight of luminescent zinc sulfide. As the vehicle is less than 50% solids, the weight of pigment is thus more than six times the weight of the solids in the vehicle. As distinguished from such ink, to produce a luminescent enamel, 100 parts of the vehicle would be mixed with only about 185 parts of pigment.

The following is a typical formula for the vehicle of an ink of the alkyd base type:

Alkyd base vehicle (percentages by weight)

| | Per cent |
|---|---|
| Alkyd resin solution (50% volatile) (Beckosol #1334 or equivalent) | 85 |
| Toluol | 13.5 |
| Lead naphthenate or linoleate drier (24% lead) | 1.2 |
| Manganese naphthalene or linoleate drier (6% manganese) | .3 |
| Total | 100 |

To produce a preferred form of luminescent ink embodying such a vehicle, 100 parts by weight of the vehicle are mixed with about 233 parts by weight of luminescent zinc sulfide. As the vehicle is less than 50% solids, the weight of the pigment is more than four and two-thirds times the weight of the solids content of the vehicle. As distinguished from such ink, to produce a luminescent enamel, 100 parts of the vehicle would be mixed with only about 150 parts of pigment. Thus, in the lacquer base ink, about 64% more pigment is employed than with an enamel, and with the alkyd base ink about 55% more pigment is employed. The proportions of pigment to vehicle employed necessarily vary with different vehicles and pigments, but as noted above, I preferably employ at least about 25% more pigment in my gravure inks, as compared to the solids content of the vehicle, than is employed in ordinary paints, enamels or lacquers made with similar vehicles and pigments.

The inks may be compounded in manners well known to those skilled in the paint and lacquer art. However, in making phosphorescent inks, the pigments must be stirred into the vehicle, or if a mill is employed, care must be exercised that the mill is not set too closely, for as noted above, the characteristics of phosphorescent pigments are impaired if they are too finely ground.

Inks, such as described above may be printed with intaglio plates with excellent results. Intaglio plates have an important advantage over relief printing plates or planographic plates in that by varying the depth of the ink-holding wells of the plates, the amount of ink deposited can be controlled very accurately and greater quantities of ink can be deposited than with other printing processes. Further, intaglio plates permit the use of my quick drying inks, which dry by evaporation rather than by oxidation and polymerization.

Preferably, I employ gravure plates of the type embodying large numbers of closely spaced wells, pockets or recesses of substantially uniform size and shape, different tonal values being produced by varying the depth, and thus the ink holding capacity, of the wells, although if desired half-tone gravure plates, in which the tonal variations are secured by varying the size, rather than the depth, of the ink-holding recesses, may be employed. In either event, the ink is carried by a large number of substantially uniformly spaced wells, pockets or recesses. Preferably the plates are made by the photogravure or half-tone gravure processes, using the usual screens, the fineness of the screens and correspondingly the size and spacing of the wells or pockets being varied in accordance with the requirements of the design and the nature of the pigments employed. For example with fluorescent pigments which can be ground reasonably fine, a screen of 150 lines per inch or finer mesh may be employed, while at the other extreme with phosphorescent pigments which cannot be ground so finely, a screen of 60 or 80 lines per inch or coarser mesh may be employed. The ink-holding recesses or pockets may also be produced by mechanical methods, for example by knurling. Such mechanical methods are especially useful where the plate is to be used to apply a continuous, substantially uniform coating.

With gravure plates embodying such recesses, not only can the film of the luminescent material be applied accurately and rapidly with great economy of materials as compared to spraying and brushing processes, but also the very nature of the plate, which consists of a surface having a great number of minute pockets or dimples for carrying the ink, is advantageous in the printing of luminescent materials. With such a plate, each minute recess in the plate deposits a minute droplet or globule of ink having a configuration complementary to that of the recess. Inks made according to my invention may be made of such stiffness or viscosity, and with such quick drying characteristics that the ink when dried will have substantially the same configuration, producing a microscopically roughened surface having an extended area which is desirable from the standpoint of the efficiency of the luminescent pigment. While this roughness gives the extended surface area desired, the roughness is of such a fine and uniform character that the surface can be subjected to a further printing operation without difficulty. This effect can be controlled by the choice of vehicle employed and by the depth and size of the wells or recesses in plate.

In carrying out the printing operations, various arrangements and sequences of operation can be employed, a few of which are diagrammatically illustrated in the drawings. In Figure 1, for example, a luminescent design is deposited on a sheet of paper 10 or other sheet material. Preparatory to receiving the design, the paper sheet is coated with a white or light-colored reflective background coat 11, the function of this being to increase the luminescent effect. On this a layer or film 12 of luminescent ink is deposited, preferably by printing by means of a gravure plate which is provided all over the area to be printed with wells or recesses of substantially uniform size and shape, thereby to deposit a uniform film of the desired thickness. Thereafter, the design 13 is printed over the luminescent layer in an opaque ink, black or another dark color preferably being employed. In the drawings, the design is shown as printed as a negative, that is, in the completed article the luminescent pigment in the shape of the letter R will appear through the opening in the design applied in the opaque ink. This type of printing seems to give the best results with the luminescent pigments, but obviously, if desired, the design could be printed as a positive on the luminescent background in which case, the printed design would appear dark on a light background just as black ink stands out on white paper. Preferably the whole sheet is then coated with a protective layer 14 of a clear lacquer or varnish.

In the modification shown in Figure 2, either a sheet of paper of the desired dark background color may be employed, or as shown in the drawings, the paper sheet 20 may be coated with a layer or film 21 of ink or lacquer of the desired background color. On this background color the design is first printed in a white or light-colored reflective ink indicated at 22, and then the luminescent ink is applied, again preferably by means of a gravure plate, over the design in white ink and in register therewith as indicated at 23. Here also the whole sheet or only the luminescent design may be given a protective coating 24 of clear lacquer or similar material. In this mode of printing, less luminescent material is required than in the form shown in Figure 1, but the two printing operations must be carried out in registration with each other; the determination of which method is more advantageous depends upon the circumstances of the particular job.

In Figure 3, I have shown a diagrammatic and greatly enlarged sectional view through a portion of the luminescent design of Figure 2. As indicated in the drawings, the luminescent design 23 is deposited over the white background 22 and is protected by the clear lacquer coating 24. The luminescent layer, being deposited from a gravure plate with ink of the desired drying qualities, has an upper surface corresponding generally in contour of the recesses in the original printing plate, although not necessarily the luminescent ink flows to some extent before it dries or sets. Thus the upper surface of the layer consists of a large number of small convex projections 25 corresponding generally to the recesses in the printing plate. The ink runs or flows sufficiently so that the individual minute globules of ink deposited by the plate will join together to provide a continuous coating; but the ink does not flatten out completely; instead, it leaves rounded, minute projections as shown. This gives an extended area of luminescent pigment as compared to the projected area of the design and results in a greater degree of luminescence.

In Figures 4 and 5 of the drawings, I have illustrated my invention as applied to the production of decalcomanias or transfers which may be used to apply a luminescent coating or design to a hard, rigid surface such as a surface of wood or metal, for example. These transfers may be made by various different methods, two preferred methods being illustrated in these figures of the drawings. In Figure 4, the transfer comprises a backing sheet 30 which may be of ordinary gummed transfer paper. This may be provided with a coating of clear lacquer 31. Next, the design 32 is printed in an opaque ink upon the surface of the clear lacquer, the design being printed as a negative and in reverse as shown in the drawings. The luminescent layer 33 is then coated or printed by gravure over the opaque ink, and if desired a backing coat 34 may be applied over the luminescent layer, depending upon the surface to which the transfer is to be applied. It will be seen that when this transfer is applied to a metal surface, for example, the lettering of the design will be luminescent, showing through the surrounding opaque ink. The final lacquer backing coat 34 applied in the making of the transfer constitutes the base coat for the fluorescent ink when the transfer is applied and the first coating 31 constitutes the protective coating over the fluorescent design. Either or both of these coatings may be omitted if desired, depending upon the characteristics of the surface to which the transfer is to be applied, the mode of application and the finishing operations necessary on the article. The backing coat 34 may be transparent or may constitute the light-colored reflective backing. If this coat is omitted or is transparent, the transfer is preferably applied to a light colored reflective surface or the surface is sprayed or otherwise coated with a light colored reflective material before the transfer is applied.

In the arrangement shown in Figure 5, the transfer paper 40 is first coated with a clear lacquer 41 then the design is printed in opaque ink as before, as indicated at 42. In this modification, instead of applying a coating of luminescent material over the entire surface, the design is printed in luminescent material as at 43, the letters being, if desired, slightly larger than the openings in the opaque ink so as to make registration of the successive impressions less difficult. Here again, a white base coating 44 may be applied over the whole sheet if desired or the white coating may be printed in back of the letter only.

My transfers are not only useful in transferring designs to metal or other rigid surfaces, but are also of great value in applying continuous coatings of luminescent materials to such surfaces. The reason for this is that the ordinary luminescent paints cannot be sanded with any degree of success without impairing their characteristics, and ordinary spraying, brushing or stenciling of luminescent prints on metal surfaces, for example, leave coarse and rough surfaces which are quite unsatisfactory, particularly when the surfaces must be subjected to further painting or printing operations. These difficulties may be overcome by making a transfer comprising a suitable backing sheet on which a layer of luminescent ink has been deposited, for when such a transfer is applied to the surface and the backing stripped away, a smooth, clean, outer surface of luminescent material is produced which is particularly suited for further treatment by way of painting or offset printing. Continuous coatings can also be applied with transfers which have additional coatings above or below the luminescent layer. A suitable transfer may be made as described in conjunction with Figure 4 of the drawings by omitting the opaque design carrying layer 32, and for some purposes either or both of the layers 31 and 34 can also be omitted. In the latter case the transfer would consist merely of the luminescent layer 33 on a suitable backing sheet of transfer paper or the like.

In applying my transfers to base material such as metal, wood, wall board and the like, I find it advantageous to bond the transfers to the base materials with the bonding materials and by the methods described and claimed in my prior Patent No. 1,924,961, patented August 29, 1933. According to my said patent, the surface to be decorated is coated with a bonding medium containing a low vapor pressure solvent so that the bonding medium will remain tacky for a period of several hours after it is applied. The transfer, which is printed with an ink that is soluble in the solvent of the bonding medium, or coated or printed with a coating which is soluble in the bonding medium, is applied to the tacky surface, and then the assembly is baked to dry out the remaining solvent.

Another advantageous method is described in my prior Patent No. 1,893,785 wherein a primer is applied to the surface on which the transfer is to be mounted, the primer is allowed to dry, and the transfer film is united to the primer by means of material which is a solvent for both the primer and the film. For example, both the transfer film and the primer may be lacquers of the cellulose ester type, and may be joined by a solution of ethyl lactate and water. It is to be noted that the luminescent inks heretofore described are particularly adapted and designed for such methods of application, these methods being especially advantageous in that the transfers may be applied rapidly, and the completed transfers are firmly and permanently bonded to the underlying material.

Regardless of how the transfer is applied to the surface to be decorated, or how the transfer is made, I prefer that a section through the luminescent areas after the transferring operation be substantially as shown in Figure 6, wherein the base material, such as a metal sheet, is indicated at 50. This is provided with a primer or ground coat 51. Next comes the white or light colored backing coat 52, then the luminescent layer 53 and the protective coating 54. It will be noted that here the convex or rounded portions 55 in the luminescent layer 53 extend toward the base material 50. However, the increased area of the luminescent material created by the curved surfaces of the portions 55 results in increased luminescence of the surface, as the luminescent layers are themselves translucent and the rounded projections increase the effectiveness of the layer 52. Also, the smooth upper surface 56 of the luminescent layer 53 is advantageous where it is desired to carry out a subsequent printing or decorating operation on the transferred film. This is particularly true where materials of the phosphorescent type are employed and where the plate is designed to deposit relatively thick coatings of phosphorescent ink with the individual wells or pockets of comparatively large size, for example when a screen of about 60 mesh is employed in making the plate.

The completed structure shown in Figure 6 can be produced by several different methods. For example, the reflective layer 52 may be coated on the transfer in the manner of the layers 34 and 44 in Figures 4 and 5, or if the transfer is to be joined to the base material by the method of my prior Patent No. 1,924,961, the reflective coating can be omitted from the transfers and instead, applied to the base material and utilized as the ground coat and bonding medium. Then when the transfer is applied to the tacky bonding medium, the minute projections on the luminescent layer form corresponding indenations in the bonding medium producing a result such as that shown diagrammatically in Figure 6. Also, the upper protective layer 54 may be omitted or may be applied after the transfer has been secured to the base material. A transparent layer may be interposed between the luminescent layer and the reflective layer or the coatings such as the priming coat 51 and the bonding medium 52 may be combined into a single coat.

In Figure 7 of the drawings, I have illustrated a transfer particularly adapted for application to a transparent surface such as a window. This may comprise a transfer paper backing sheet 60, a white or light-colored reflective coating 61 on the transfer paper, a design 62 printed in luminescent ink on the reflective coating, the opaque background coating 63 with the design cut out or negative, with the cut-out area preferably slightly less than the area of the luminescent design so as to avoid difficulty in securing proper register, and the clear protective coating 64. On this protective coating, a water soluble adhesive layer 65 may be applied so that the transfer may be easily applied to the inside of a window for example, the backing paper 60 being stripped off after the transfer is applied. Inasmuch as this transfer is designed to be viewed from outside of the window, the design is not reversed.

From the foregoing description of the various forms of my invention, it will be evident that by my invention surfaces can be decorated rapidly and economically with luminescent materials. By employing the inks of my invention, the printing operations can be carried out rapidly and accurately by gravure printing methods, and the gravure printing methods enable me to deposit relatively large quantities of luminescent materials as compared to the relatively small quantities which could be deposited by prior printing methods. The gravure printing methods also permit the use of a wide variety and range of vehicles, and the characteristics of the vehicles can be varied to obtain the desired results. Further, with gravure printing of luminescent pigments, and especially with inks of my invention which contain high percentages of pigment and which dry very quickly, it is possible to produce surfaces consisting of large numbers of closely spaced convex projections of substantially uniform size and shape. These projections increase the luminosity of the surfaces, whether the projections face outwardly as in the case of a printed article or inwardly as in the case of an article where the design is transferred to the surface to be decorated.

By my transfers it is possible to apply luminescent designs to metallic or other surfaces economically and efficiently with great savings in time as compared to present methods where the luminescent material must be applied by hand. Further, with my transfers it is possible to coat surfaces substantially uniformly with luminescent materials providing smooth uniform surfaces which are particularly adapted to receive further decorations, such as designs applied thereto by offset printing methods.

I have described in the foregoing specification a number of preferred aspects of my invention. Further changes and modifications can be made in the preferred forms described herein without departing from the spirit and scope of my invention. Accordingly, it is to be understood that my patent is not limited to the preferred forms described herein or in any manner other than by the scope of the appended claims.

I claim:

1. A decalcomania transfer comprising a backing sheet of transfer paper, a transparent film on the backing sheet, a design printed in negative on said film and composed of an opaque material, and a luminescent layer overlaying at least the openings in said design.

2. A decalcomania transfer comprising a backing sheet detachably carrying a luminescent design, a complementary design in an opaque ink surrounding said luminescent design, and a light-colored reflective film overlying said luminescent design.

3. A transfer comprising a backing sheet detachably carrying a film of luminescent material, said film comprising a luminescent pigment in a resin carrier, one surface of said film having a great number of small, uniformly closely spaced convex raised portions thereon.

4. The method of applying luminescent materials to surfaces which comprises printing on a backing sheet with a luminescent ink comprising a luminescent pigment in a vehicle composed of a resin capable of transmitting ultra-violet light and an evaporable solvent therefore, with a gravure plate to provide a luminescent coating having a surface generally complementary to the surface of the gravure plate, and comprising a large number of small, closely spaced, convex raised portions, drying said coating, thereafter transferring said coating to a base material, and interposing between the base material and said coating a light-colored reflective film bonded to said backing material and said coating, without destroying the said convex raised portion of said coating.

5. The method of applying luminescent material to a base material which includes the steps of providing a backing sheet with a removable film containing a luminescent pigment, drying said film, the upper surface of said film comprising a large number of small, closely spaced, convex raised portions, applying to the base material a liquid bonding medium containing a solvent for said film, drying said bonding medium until it reaches a tacky condition, applying the outer surface of said film to said bonding medium while said bonding medium is in a tacky condition whereby said bonding medium is molded into a contour corresponding to the contour of said surface embodying said convex portions, and drying the assembly.

THOMAS S. REESE.